United States Patent [19]

Bee et al.

[11] Patent Number: 4,930,319
[45] Date of Patent: Jun. 5, 1990

[54] SUBLIMATION METHOD

[75] Inventors: Rodney D. Bee, Eaton Ford; Anthony M. Palmer, Podingcon, both of Great Britain

[73] Assignee: Thomas J. Lipton, Inc., Englewood Cliffs, N.J.

[21] Appl. No.: 366,614

[22] Filed: Jun. 12, 1989

[30] Foreign Application Priority Data

Jun. 17, 1988 [GB] United Kingdom ............... 8814477

[51] Int. Cl.$^5$ ............................................. F25C 1/00
[52] U.S. Cl. ............................................ 62/69; 62/1; 62/46.1
[58] Field of Search ............... 62/1, 66, 69, 306, 39, 62/46.1, 46.2

[56] References Cited

U.S. PATENT DOCUMENTS

| | | | |
|---|---|---|---|
| 3,086,370 | 4/1963 | Barnes et al. | 62/1 |
| 3,217,503 | 11/1965 | Mitchell et al. | 62/1 X |
| 4,333,315 | 6/1982 | Zernelman et al. | 62/1 |
| 4,347,707 | 9/1982 | Zernelman et al. | 62/1 X |
| 4,393,660 | 7/1983 | Kleiner et al. | 62/69 |
| 4,398,394 | 8/1983 | Kleiner et al. | 62/1 |
| 4,404,807 | 9/1983 | Zernelman et al. | 62/1 |
| 4,487,023 | 12/1984 | Hegadorn et al. | 62/46.2 X |
| 4,738,862 | 4/1988 | Bee | 62/1 X |

Primary Examiner—William E. Tapolcai
Attorney, Agent, or Firm—Brumbaugh, Graves, Donohue & Raymond

[57] ABSTRACT

A gaseous mixture comprising an edible gas-hydrate-forming material and gaseous water is positively conveyed to a spot where temperature and pressure conditions are arranged in conformity with the phase diagram water/clathrate/gas-hydrate-forming material suitable for forming gas-hydrate-clathrate of said components.

6 Claims, 1 Drawing Sheet

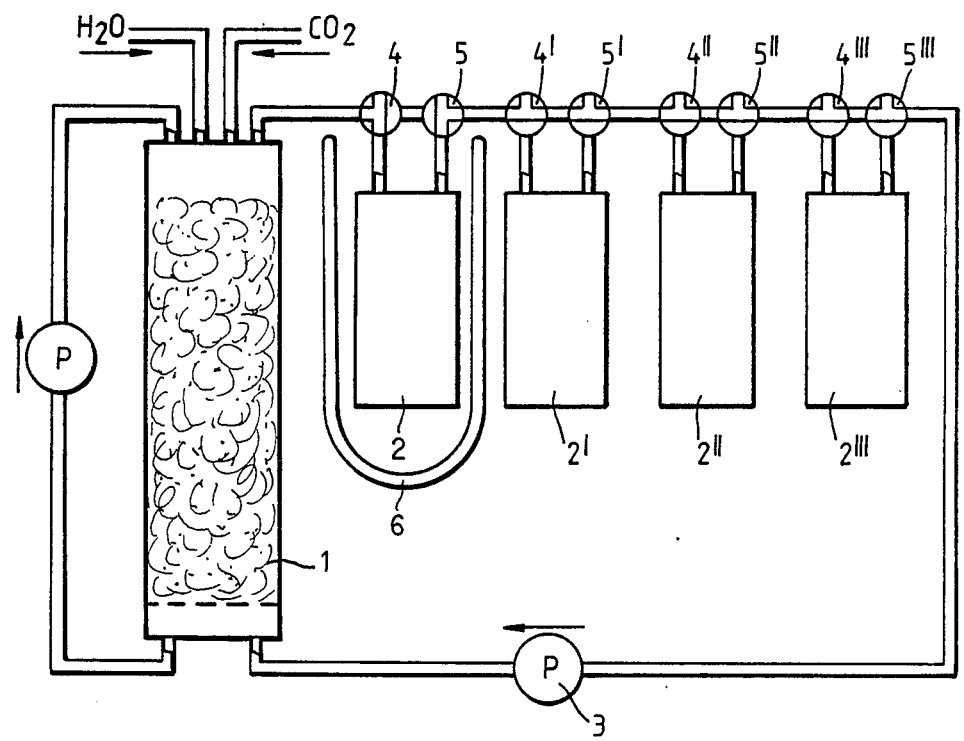

SUBLIMATION METHOD

The invention relates to a method of preparing an edible gas-hydrate clathrate wherein at least one edible gas-hydrate-forming material and water are combined and brought under conditions of temperature and pressure capable of forming the clathrate of said material and water.

A method as described above is disclosed in U.S. Pat. No. 4,393,660 and comprises dissolving the gas-hydrate-forming material such as nitrous oxide and carbon dioxide into an aqueous liquid under conditions suitable to form a clathrate.

An object of the invention is to provide an industrially applicable method whereby clathrates of well-controllable composition may be obtained. Another object is to provide such a method whereby clathrates of high clathrated gas content may be obtained.

The invention provides thereto a method of preparing an edible gas-hydrate-clathrate comprising positively conveying at least one edible gas-hydrate-forming material in gaseous state and gaseous water as a mixture towards a predetermined spot and arranging conditions of temperature and pressure at said spot suitable for forming a gas-hydrate-clathrate of said material and water. The expression "positively conveying" in this specification and claims relates to conveying speeds and capacities suitable for industrial application and positively excludes transport by diffusion only.

If highly active clathrate material is to be prepared, i.e. a gas-hydrate clathrate containing substantially no water or ice $1h$, at least a minimum ratio of gas-hydrate-forming material to water is to be used. On the other hand, if a large excess of this material is used, the production rate will become very slow. For instance, the minimum ratio of $CO_2$ to $H_2O$ molecules to be used in the vapour phase is 0.126 $CO_2$: 1 $H_2O$ such that $CO_2$ gas hydrate substantially free from water or ice $1h$ is formed. The maximum ratio $CO_2$ to $H_2O$ in the vapour phase is obtained using a $CO_2$ partial pressure of 44 atmospheres and a $H_2O$ vapour partial pressure of 0.012 atmospheres and is equivalent to a molecular ratio of $3.67 \cdot 10^3$ $CO_2$ molecules to 1 $H_2O$ molecule. These ratios are used in conjunction with condensation temperatures below 10° C. such that $CO_2$ hydrate forms.

The temperature and pressure conditions are controlled in conformity to the well-known phase diagram water/clathrate/gas-hydrate-forming material.

In a preferred embodiment, a gaseous mixture comprising $CO_2$ and $H_2O$ in a molecular ratio between 0.3:1 and 5:1 is used.

The invention will be exemplified in the following non-limiting Example of the invention, serving for illustration purposes only.

EXAMPLE

Using an apparatus as schematically shown in the drawing, $CO_2$ gas at a pressure of 10 atmospheres is fed through a tower 1 filled with a usual large surface area packing. Water is introduced at the top of the tower, withdrawn at the bottom and re-introduced at the top so that an equilibrium between the liquid and the gas phase in the tower is established. A temperature at which gas-hydrate formation does not occur is used, actually above 10.2° C. Alternatively, any standard method for obtaining gaseous mixtures can be used, for example water can be provided into the carbon dioxide as aerosol droplets or by high temperature steam injection.

The mixture of gaseous $CO_2$ and gaseous $H_2O$ so established is conducted through one of the condensation vessels 2. This flow is brought about by a pressure difference, created by pump 3 in the gas circuit, which recirculates the gas to the bottom of the tower 1 again.

The temperature conditions in the condensation vessel 2 are established so that clathrate is formed near the ideal composition of $CO_2$ gas hydrate, i.e. 0.174 $CO_2$.-$H_2O$. This is the composition of a clathrate having a $H_2O$ matrix, the voids of which are all occupied by $CO_2$ molecules. In practice, the product contains slightly less $CO_2$ than this "ideal" composition, even though the crystal structure is that of a gas-hydrate. The degree of occupation of the voids by gas molecules is temperature- and pressure-dependent: in general, it decreases with increasing temperature and with decreasing pressure. In this example, using a pressure of 10 atmospheres, $-10°$ C. is preferred. Vessel 2, through which the gas mixture is fed, may be cooled in a manner known to those skilled in the art; for example, as in FIG. 1 wherein an isolating vessel or jacket 6 containing a suitable coolant is employed around vessel 2. After the required amount of solid $CO_2$-$H_2O$ clathrate has been formed in the condensation vessel, this vessel is isolated from the gas circuit by closing the valves 4 and 5 and opening a by-pass between these valves. Simultaneously, the next, empty vessel 2' may be put in use by opening the valves 4' and 5' towards said empty vessel 2' after having cooled it down to $-10°$ C.

The filled vessel 2 may be emptied by equilibrating the pressure to atmospheric and raising the jacket temperature until adhesion between the clathrate hydrate and the condenser surface is broken. Under these conditions this happens slightly above the melting point of ice $1h$. Now the ingot, which is substantially $CO_2$-gas-hydrate, may be removed from the vessel. Alternatively, the solid gas-hydrate may be removed from the condensation vessel by mechanical breaking.

Although methods similar to the one described above are preferred at the moment, it needs to be stated that different methods are possible, such as by preparing at elevated temperature of, say, 180° C. a gaseous mixture of $CO_2$ and water of "ideal" composition as defined before. By connecting the vessel in which this mixture is prepared to a vessel which is cooled below $+10°$ C., the gas mixture will quickly flow to this vessel and condense to a $CO_2$ hydrate, substantially free from common ice or water, which may be removed from the vessel by allowing the wall of the vessel to heat up as described hereinbefore. This method requires good control of the heat economy.

We claim:

1. A method of preparing an edible gas-hydrate-clathrate comprising positively conveying at least one edible gas-hydrate-forming material in gaseous state and gaseous water as a mixture towards a predetermined spot and arranging conditions of temperature and pressure at said spot suitable for forming a gas-hydrate-clathrate of said material and water.

2. A method according to claim 1, wherein a gaseous mixture is used comprising at least 0.126 moles of the gas-hydrate-forming material to each mole of water.

3. A method according to claim 1, wherein a gaseous mixture is used comprising from 0.3 to 5 moles of the gas-hydrate-forming material to each mole of water.

4. A method according to claim 1, wherein a gaseous mixture is used comprising a molar excess of the gas-hydrate-forming material.

5. A method according to any one of claims 1 to 4, wherein $CO_2$ is used as a gas-hydrate-forming material.

6. A method according to any one of claims 1 to 4, wherein nitrous oxide is used as a gas-hydrate-forming material.

* * * * *